United States Patent [19]
Blasy et al.

[11] 3,905,678
[45] Sept. 16, 1975

[54] CYCLE REFLECTOR

[76] Inventors: Richard M. Blasy, 1009 Scott St., Midland, Mich. 48460; Richard T. McDermott, 5078 Chainbridge Rd., Bloomfield Hills, Mich. 48813

[22] Filed: Apr. 24, 1974

[21] Appl. No.: 463,608

[52] U.S. Cl. ............................................. 350/97
[51] Int. Cl.² ......................................... G02B 5/12
[58] Field of Search ............................... 350/97, 99

[56] References Cited
UNITED STATES PATENTS
2,975,675 3/1961 Knight .................................. 350/97

FOREIGN PATENTS OR APPLICATIONS
1,099,116 8/1955 France .................................. 350/97

*Primary Examiner*—Ronald L. Wibert
*Assistant Examiner*—Richard A. Rosenberger
*Attorney, Agent, or Firm*—Bacon & Thomas

[57] ABSTRACT

Disclosed is a novel cycle reflector and a cycle-caliper brake subassembly containing this novel reflector. The reflector is specially adapted for installation on a cycle having caliper braking means and comprises a first generally flat surface adapted to abut transversely against a cycle fork assembly, at least one pair of lateral support members to cooperate with the fork assembly, a second generally flat surface adapted to be in alignment substantially vertical and substantially normal to the direction of travel of the cycle in its conventional operating position, reflecting means positioned upon the second flat surface and an aperature adapted to permit passage through the reflector of a bolt or the like used to fasten the caliper brake to the cycle fork.

15 Claims, 8 Drawing Figures

PATENTED SEP 16 1975 3,905,678

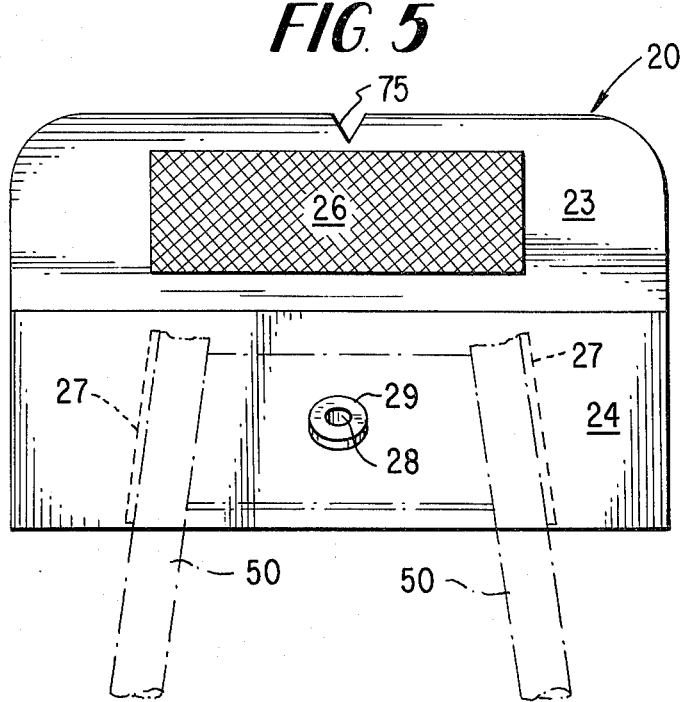
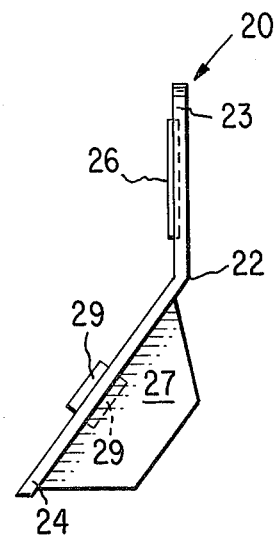
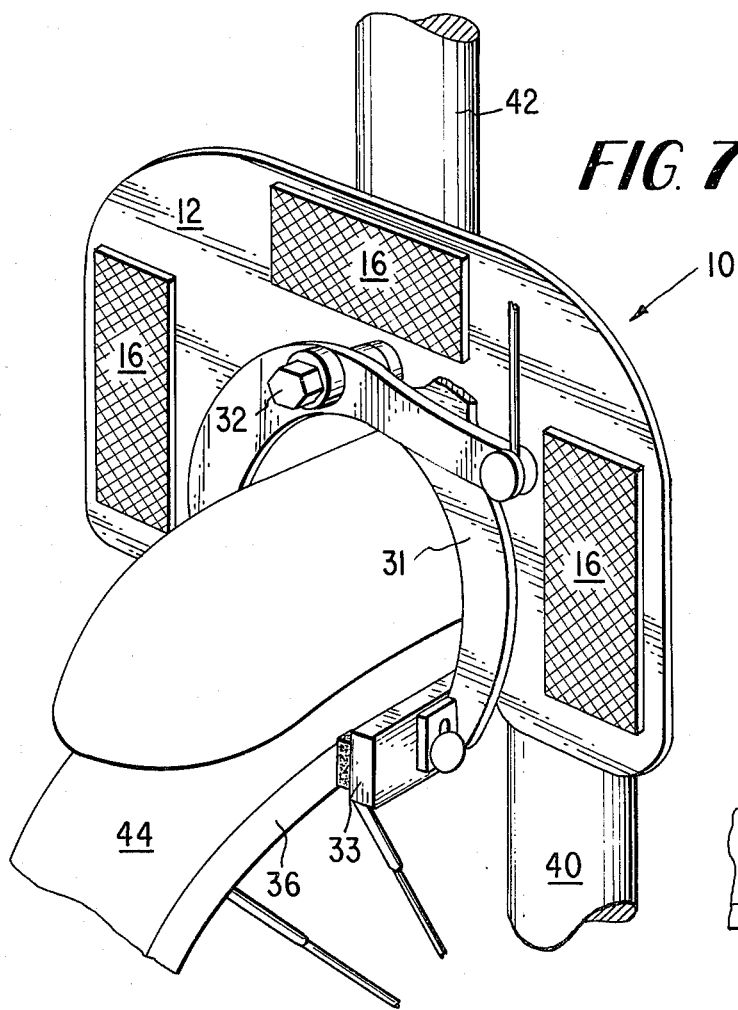
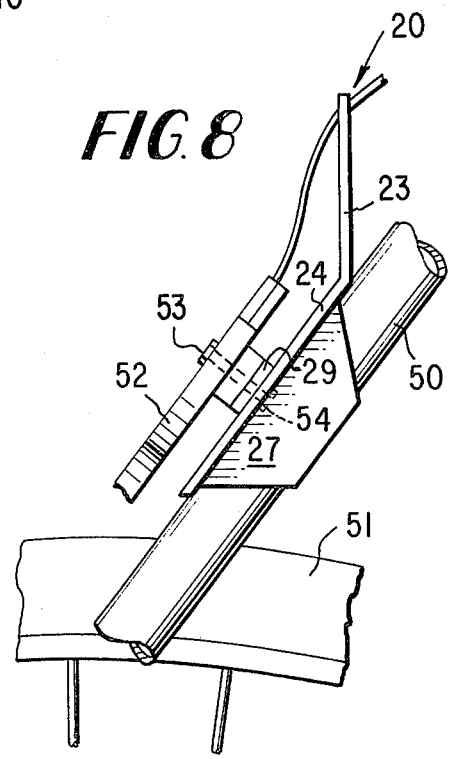

CYCLE REFLECTOR

BACKGROUND OF THE INVENTION

The present invention relates to a cycle reflector, and more especially to a cycle reflector specially adapted for installation upon a cycle having caliper brakes.

The need for proper reflector devices on bycycles, motorcycles and the like has always been recognized but has perhaps never been accorded the degree of importance as in recent years in view of the tremendous growth in the popularity of bicycling as a sport and as an alternative means of transportation. Because of an alarming increase in the number of cycling accidents, the U.S. Department of Health, Education and Welfare has recently proposed a comprehensive set of rules concerning various requirements for bicycles, including regulations governing reflectorization. These proposed rules require that every bicycle be equipped with a front reflector, a rear reflector, pedal reflectors and side reflectors. Furthermore, with respect to each of the above mentioned reflector locations, the rules set forth a number of performance requirements for the individual reflectors to be installed at each location. For example, for both the front and rear reflectors, the horizontal-vertical optical axis of the reflector shall be within 5° of the horizontal-vertical alignment of the bicycle when the bicycle wheels are tracking a straight line. The reflectors must, in fact, be designed so that assembly or mounting upon the cycle in any other than the intended horizontal-vertical alignment is precluded. Also, the front and rear reflectors must be capable of maintaining the proper alignment when a force of twenty pounds is applied to the reflector or the mounting device in any direction. It is also required that the rear reflector in its mounted position shall not be obscured by a rider or his appropriate clothing. It is also specified that the reflector or its mount shall not contact the ground plane when the bicycle is resting on the ground in any conceivable orientation. Finially, it is expected that the size of the reflecting surfaces required under any new regulations will be considerably larger than the size of reflecting device considered sufficient in the past.

These proposed rules will require the design of fundamentally new designs for reflector devices to replace those conventional reflectors which will no longer satisfy the regulations and also to provide reflectors for certain types of cycles for which no suitable devices have heretofore been provided. For example, many of the more popular styles of bicycles being sold today are not provided with fenders, and accordingly, the most conventional mode of reflector attachment is therefore precluded. It is now been made clear that the bicycle seat may not be used as a proper place for mounting the rear reflector in view of the likelihood that the reflector will be obscured by the rider's clothing. Reflectors mounted along the lower portion of the rear cycle fork are also precluded by the proposed regulations. Similarly, a front-facing reflector has not previously been required, and there is accordingly no technology available for the design of such a front-facing reflector or mounting means therefor which will withstand a force of twenty pounds without suffering from lateral misalignment.

A very large percentage of all bicycles being sold today are provided with caliper-type brakes, e.g., conventional hand brakes. Hence, additional problems arise in designing suitable reflectors and/or reflector mounts since the presence of front and/or rear caliper brakes effectively eliminates one possible and very likely location for the attachment of a reflector. Obviously, the design of any reflector for a cycle having caliper brakes must not interfere with the effective operation of the braking system.

SUMMARY OF THE INVENTION

It is, therefore, an object of the present invention to provide a new and improved cycle reflector design.

A further object of the present invention resides in the provision of a cycle reflector which is specially adapted for a cycle having a caliper braking system.

It is also an object of the present invention to provide a reflector which can be readily mounted upon a bicycle having a caliper braking system and which additionally is not provided with any fenders.

Another object of the present invention resides in the provision of a reflector design which fulfills all of the requirements of anticipated new federal rules governing cycle reflectorization.

It is also an object of the present invention to provide specific reflector designs which are adapted for installation, specifically either on the front caliper brake assembly or the rear caliper brake assembly of a bicycle.

Another object of the invention is to provide a reflector design which does not interfere with the operation of the caliper brakes on a cycle and which, on the contrary, cooperates with the caliper brake mechanism to provide a protective device therefor.

In accomplishing the foregoing objects, there has been provided in accordance with the present invention an improved cycle reflector adapted for installation on a cycle having caliper braking means, comprising a first generally flat surface adapted to abut transversely against a cycle fork assembly, at least one pair of lateral support members protruding from said flat surface and being positioned thereon in a manner to lie closely adjacent the lateral edges of the fork assembly, so that lateral movement or rotation of the reflector is prevented, a second generally flat surface adapted to be in an alignment substantially vertical and substantially normal to the direction of travel of the bicycle in its conventional operating position, reflecting means disposed upon the second flat surface and aperature means adapted to permit passage through the reflector of bolt fastening means for the caliper braking assembly. Preferably, the lateral support members comprise a pair of rib members extending along substantially the entire dimension of the first flat surface which abuts transversely against the cycle fork assembly, these rib members preferably being adapted to lie along the two outside lateral edges of the fork assembly. The reflector also preferably embodies some means to separate the reflector from the caliper braking assembly which is adjacent thereto, for example, this may be accomplished by a raised portion surrounding the aperature adapted to receive the bolt fastening means for the caliper brakes. Any suitable material may be employed to construct the reflector of the present invention, including metal, plastic, wood and combinations thereof; however, it is preferred that the reflector be constructed from an integrally molded synthetic resinous material. The reflecting surfaces comprise any acceptable reflector material and may be integrally molded with the entire reflector assembly or secured thereto by any suitable means such as adhesives or the like. The reflecting surfaces preferably comprise conventional automotive reflex reflectors. A deviation of less than about 5° from vertical and normal to the direction of travel is required for the reflecting surfaces.

In one embodiment of the invention, the reflector adapted for installation on the front fork assembly of a cycle is a combined reflector and brake protector. In this embodiment the reflector comprises an inverted generally U-shaped configuration with the downwardly depending legs of the inverted U extending to a point at least about at the respective brake pads of the caliper braking assembly. In this embodiment, the lateral support members comprise a pair of rib members extending along substantially the entire length of each of the downwardly depending legs of the inverted U, and accordingly, these lateral support means also serve as reinforcing means for the reflector. Reflecting surfaces are preferably positioned on each of the downwardly depending legs of the inverted U configuration, as well as on the horizontal base portion of the inverted U. This embodiment also includes a cycle-caliper brake subassembly comprising a cycle fork member, a caliper braking mechanism, bolt means for fastening the caliper braking mechanism to the cycle fork member and the above-described inverted U-shaped reflector positioned between the caliper braking mechanism and the fork member.

In another embodiment of the invention, the cycle reflector is adapted for installation on the rear fork stays of a cycle and comprises a non-planar configuration wherein said flat surface lies in a plane defined by said cycle fork assembly and said second flat surface is joined to said first surface at an angle appropriate to produce an alignment substantially vertical and substantially normal to the direction of travel of the cycle in its conventional operating position. In this embodiment, the lateral reinforcement means also preferably comprise a pair of rib members extending along substantially the entire dimension of the first flat surface transversely abuts against the cycle fork assembly, and the rib members in this case are positioned in spaced, gradually diverging relationship with respect to one another to conform with the arrangement of the fork assembly. In accordance with a modification of this embodiment, the reflector further comprises a third generally flat surface comprising legs downwardly depending from the first flat surface and forming a generally inverted U-shaped configuration therewith, each of the legs being joined at an angle appropriate to produce an alignment of the third surface substantially vertical and substantially normal to the direction of travel of the cycle in its normal operating position. The third surface comprised of the two legs also contains the reflecting means. The invention also contemplates a cycle-caliper brake subassembly comprising a cycle fork member, a caliper braking mechanism, bolt means for fastening the caliper braking mechanism to the cycle fork and the cycle reflector described in accordance with the immediately foregoing embodiment positioned between the caliper brake mechanism and fork member.

A further aspect of the present invention involves the more general feature of providing a cycle reflector having a generally inverted U-shaped configuration, means to mount the generally U-shaped reflector to the frame of a cycle and reflecting means disposed upon the U-shaped member, wherein at least a portion of the downwardly depending legs and at least a portion of the transverse base portion of the inverted U are oriented so that the major surfaces thereof are substantially vertical and substantially normal to the direction of travel of the cycle in its conventional operating position. The reflector preferably is mounted to the cycle between a caliper brake assembly and a fork member of the cycle, preferably by means of the bolt member which secures the caliper brake assembly to the fork, and the reflector preferably comprises at least two lateral support members protruding from the surface of the reflector adjacent to the cycle fork member and being adapted to lie adjacent the fork member.

Further objects, features and advantages of the present invention will become apparent from the detailed description of the invention set forth hereinbelow, when considered together with the drawings attached hereto.

BRIEF DESCRIPTION OF THE DRAWINGS

In the drawings:

FIG. 5 is a front elevation view of an alternative cycle reflector in accordance with the present invention, illustrating a portion of a rear cycle fork assembly in phantom lines;

FIG. 6 is a right side view of the cycle reflector only shown in FIG. 5;

FIG. 7 is a front prospective view of a cycle-caliper brake front wheel subassembly including a cycle reflector in accordance with the present invention; and FIG. 8 is a side elevation view of a cycle-caliper brake rear wheel subassembly including a cycle reflector of the invention.

DETAILED DESCRIPTION OF THE INVENTION

The present invention relates to a novel cycle reflector which finds utility on bicycles, motorbikes, motorcycles or any other similar device, but which is especially well suited for use on bicycles and particularly bicycles having caliper braking systems. Bicycles to which the invention pertains are conventional ones having a frame, a seat mounted on the frame and handle bars which turn in a collar at the front of the frame and thereby turn the front fork of the bicycle to steer it. A rear wheel is rotatably secured to the frame and carries a rear sprocket. The bicycle is moved by means of pedals rotatably mounted at the bottom end of the frame which turn the front sprocket to drive the rear wheel by means of a rear sprocket and a chain. A front wheel is rotatably mounted within the front fork, and a bicycle may optionally have a front and/or rear fender secured to the front or rear fork, respectively. The bicycle may be provided with conventional coaster brakes or caliper brakes, e.g., and operated by means of one or more levers attached to the handle bars.

Figure 1:
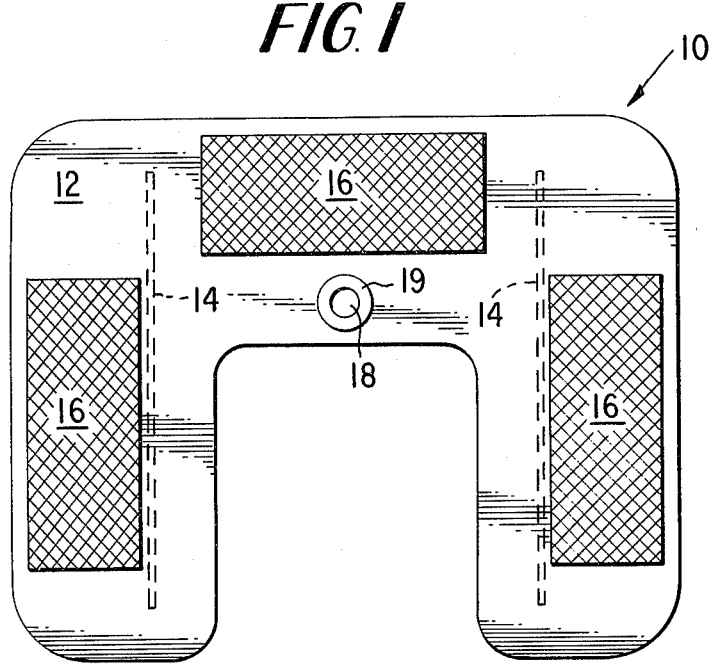
FIG. 1 is a front elevation view of the cycle reflector in accordance with the present invention.
Figure 2:
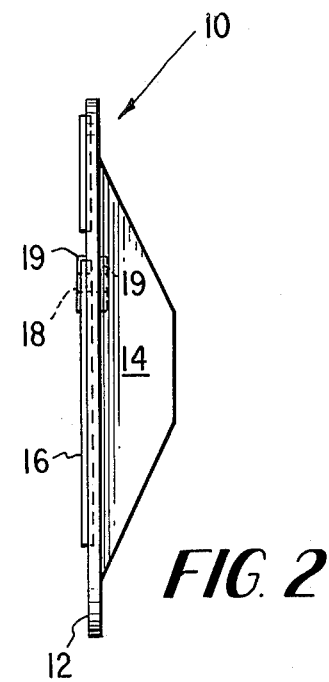
FIG. 2 is a right side view of the cycle reflector of FIG. 1.

Referring now to the drawings, in FIGS. 1 and 2 there is illustrated a cycle reflector of the invention designated generally by the reference numeral 10. The reflector has a generally planar base member 12 which is formed in the shape of a generally inverted U-shaped configuration. On the back of the generally planar base member 12 there are two rib-like protrusions 14 which serve both as reinforcing members for the entire reflector structure as well as lateral support members for the reflector structure when it is positioned upon a bicycle. The reflecting surfaces per se are disposed upon the front side of base member 12, in the form of individual reflecting surfaces 16, although other arrangements, numbers or configurations of reflecting surfaces can be employed. At the center of the transverse base portion of the generally inverted U-configuration is located an aperature 18 which is adapted to receive a bolt member of the type employed to attach a caliper brake assembly to a bicycle. A raised portion 19 surrounds aperature 18 and provides a spacing means to separate the reflector from a caliper brake assembly positioned in front of the reflector 10. The reflector of FIGS. 1 and 2 is designed to be employed as a front reflector on a bicycle, as will be discussed in more detail hereinbelow.

Figure 3:
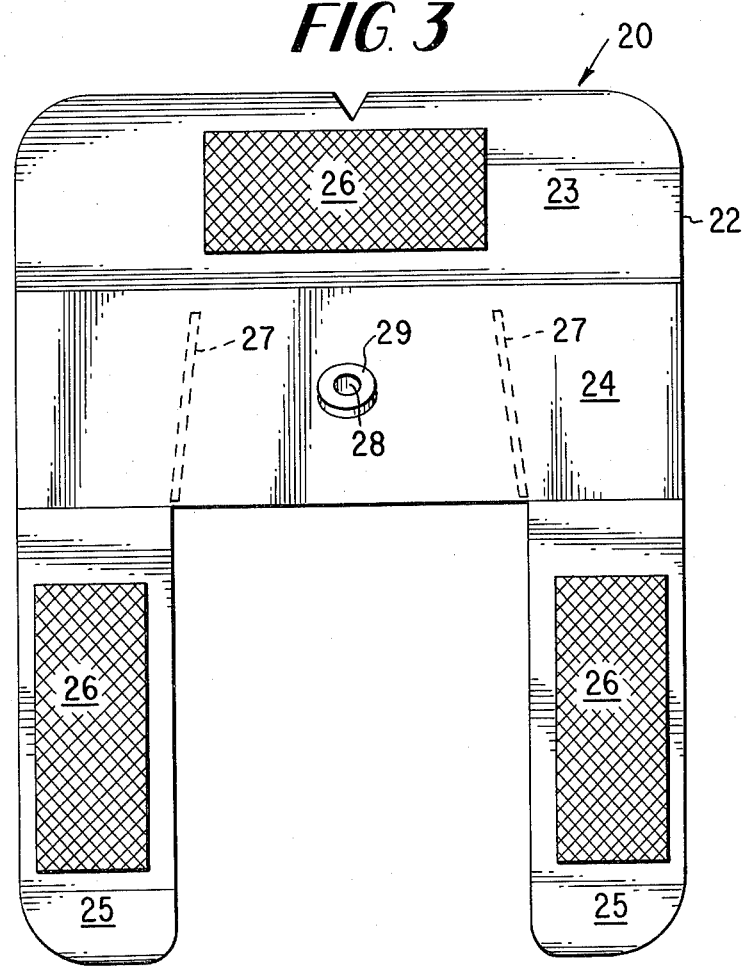
FIG. 3 is a front elevation view of another cycle reflector of an alternative embodiment of the present invention.
Figure 4:
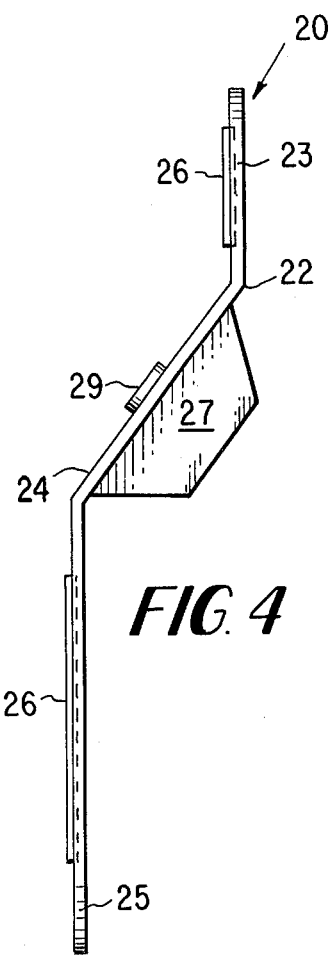
FIG. 4 is a right side view of the cycle reflector of FIG. 3.

In FIGS. 3 and 4 there is illustrated an alternate design of a reflector 20 which is particularly adapted for use as a rear reflector on a bicycle. The reflector 20 comprises a non-planar base member 22 which is made up of three generally planar sections including a top section 23, a center section 24 and two downwardly directed leg sections 25. When the reflector is mounted on the rear fork of a bicycle, the top section 23 and the leg sections 25 are disposed substantially vertically as illustrated in FIG. 4, and it is upon these sections of the reflector where the reflecting surfaces 26 are located. The center portion 24 rests upon the rear bicycle fork structure when the reflector is installed, and therefore, section 24 contains two ribs or flanges 27 projecting from the rear surface thereof. Since the ribs 27 engage with the bicycle fork members (stays) which in the case of the rear fork member have a diverging configuration, the ribs 27 are also positioned in a gradually diverging relationship with respect to each other. The center section 24 also contains an aperature 28 to accept the caliper brake mounting bolt and preferably also has a raised portion 29 surrounding said aperture in order to provide a means for separating the caliper brake assembly from the reflector 20 and, in the case of the rear embodiment, also from the cycle fork.

In FIGS. 5 and 6 of the drawings there is illustrated a modified version of the reflector 20 shown in FIGS. 3 and 4, and it corresponds identically therewith except that the embodiment in FIGS. 5 and 6 does not have the downwardly depending legs 25 or the reflecting surfaces 26 disposed on said legs. Accordingly, like reference numerals in FIGS. 5 and 6 designate equivalent parts of the device as illustrated in FIGS. 3 and 4. There is additionally illustrated in FIG. 5 the positioning of reflector 20 upon a rear bicycle fork member 50. From this figure it will be noted that ribs 27 are arranged in such a manner on the rear side of base section 24 that the angle of divergence of the ribs is identical to the angle of divergence of the bicycle rear fork elements 50, so that the ribs 27 lie contiguous to the outer lateral edges of the fork members when the reflector is in place.

The positioning of a rear reflector of the present invention, for example, of reflector 20 illustrated in FIG. 5, is shown further in FIG. 8 of the drawings. The general relationship of the rear bicycle fork 50, the rear tire 51, the rear caliper brake assembly 52 and the reflector 20 is illustrated in FIG. 8, from which it is observed that flat portion 24 of the reflector base member 22 rests transversely across the fork assembly 50, with rib members 27 extending forwardly along the outside edge of the fork 50. Caliper brake assembly 52 is secured to the bicycle rear fork 50 by means of bolt 53 which passes through the caliper brake assembly and is secured with a nut or like element 54 located behind a plate welded to the bicycle fork member (this plate is shown in phantom lines in FIG. 5). The reflector 20 is positioned between the caliper brake assembly 52 and the fork member 50, and the function of optional spacing embossment 29 to separate the caliper brake assembly from reflector 20 may likewise be seen. It will be apparent that the embodiment illustrated in FIGS. 3 and 4 of the drawings is secured to the bicycle and cooperates with the respective bicycle components in the same manner as illustrated in FIG. 8, the only difference being that downwardly depending legs 25 extend downwardly from the lowermost edge section 24 of reflector 20 in such a manner as to pass on the outside of the rear fork members 50.

In FIG. 7 the cooperation of a front reflector of the invention, for example, the reflector illustrated in FIGS. 1 and 2 of the drawings, is illustrated in relationship to the elements of a bicycle front wheel subassembly. The reflector is designated generally by reference numeral 10 and has three reflecting elements 16 located on the front surface of base member 12. Reflector 10 fits up against the front bicycle fork member 40 in such a manner that rib members 14 extending from the rear of base member 12 are positioned closely adjacent the outer lateral edge of fork member 40 on either side of the bicycle tire 44. This prevents any lateral movement and/or rotation of the reflector 10. The bicycle is provided with a caliper brake assembly 31 which is fixed to the front fork member 40 by means of bolt 32 passing through the caliper brake mechanism and also through the fork member in the vicinity of the juncture point of upperpost 42 and the lower fork elements 40. Each arm of the caliper brake assembly 31 contains a brake pad 33 which is positioned to engage with wheel rim 36. The downwardly depending legs of reflector 10 preferably extend to a point at or below the position of brake pads 33, in order that the reflector 10 may also serve as a protective device for the caliper brake 31. In this way, moisture or other debris picked up by the tire 44 during operation of the bicycle would be intercepted by the legs of reflector 10 before being thrown into the area of the caliper brake 31 where it could interfere with proper operation of the brake.

The base portion of the reflectors in accordance with the present invention may be fabricated from any suitable material, such as metal, plastics, wood or combinations thereof. In the preferred embodiment of the invention, the reflector base is integrally formed of a moldable synthetic resinous material by means of conventional injection molding techniques. The reflecting surfaces may likewise be integrally molded with the remainder of the reflector structure, or alternatively, the reflecting surfaces may be attached to the reflector base structure by adhesive means, or other suitable fastening means after the base structure has been formed.

It will be understood that any reflecting surface may be employed in conjunction with the reflectors of the present invention. The sole criterion is whether a given reflecting material meets the safety requirements in effect at the time the reflector is manufactured. In the preferred embodiment of the invention, the reflecting surfaces are produced from conventional automotive reflex reflector material, for example, material designed to meet SAE standard J594e. Reflectors of this type may either be attached to the reflector base elements subsequent to manufacture or may be integrally molded therewith by the use of appropriate, albeit rather expensive, injection molding equipment.

While the foregoing invention has been described with reference to several specific embodiments thereof, it is apparent that many additions and/or modifications of the specific embodiments illustrated may become readily apparent to a person skilled in the art without departing from the spirit and scope of the invention. For example, it may be possible to provide additional fastening means in connection with the rearwardly extending rib members on the reflectors in order to alternatively or more securely fasten the reflector to the fork member of a bicycle. Accordingly, it is to be understood that the exclusive rights to the present invention are to be determined solely with reference to the claims appended hereto.

What is claimed is:

1. A cycle reflector adapted for installation on a cycle having caliper braking means, comprising a first generally flat surface adapted to abut transversely against a cycle fork assembly, at least one pair of lateral support members protruding from said flat surface and being positioned thereon in a manner to lie closely adjacent the lateral edges of said fork assembly, whereby lateral movement or rotation of said reflector is prevented, a second generally flat surface adapted to be in an alignment substantially vertical and substantially normal to the direction of travel of the cycle in its conventional operating position, reflecting means disposed upon said second flat surface and aperture means adapted to permit passage through said reflector of bolt fastening means for a caliper braking assembly.

2. The cycle reflector as defined by claim 1, wherein said lateral support members comprise a pair of rib members extending along substantially the entire dimension of said first flat surface abutting transversely against the cycle fork assembly.

3. The cycle reflector as defined by claim 2, wherein said rib members are adapted to lie along the two outside lateral edges of the fork assembly.

4. The cycle reflector as defined by claim 1, further comprising means to separate said reflector from said caliper braking assembly.

5. The cycle reflector as defined by claim 4, wherein said separating means comprises a raised portion surrounding said aperture means for passage through said reflector of bolt fastening means for said caliper braking means.

6. The cycle reflector as defined by claim 1, wherein said reflector is adapted for installation on the front fork assembly of a cycle as a combined reflector and brake protector, and comprises an inverted generally U-shaped configuration with the downwardly depending legs of said inverted U extending to a point at least about at the respective brake pads of said caliper braking assembly, wherein said first and second flat surfaces comprise respectively the back and front surfaces of said generally U-shaped configuration.

7. The cycle reflector as defined by claim 6, wherein said lateral support members comprise a pair of rib members extending along substantially the entire length of each of said downwardly depending legs of said inverted U, whereby said lateral support means comprise also reinforcing means.

8. The cycle reflector as defined by claim 6, wherein said reflecting means are positioned on each of said downwardly depending legs of said inverted U and on the transverse base portion of said inverted U.

9. The cycle reflector as defined in claim 1, wherein said reflector is adapted for installation on the rear fork assembly of a cycle and comprises a non-planar configuration wherein said first flat surface lies in a plane defined by said cycle fork assembly and said second flat surface is joined to said first surface at an angle appropriate to produce an alignment substantially vertical and substantially normal to the direction of travel of the cycle in its conventional operating position.

10. The cycle reflector as defined in claim 9, wherein said lateral support means comprise a pair of rib members extending along substantially the entire dimension of said first flat surface abutting transversely against the cycle fork assembly and being positioned in spaced, gradually diverging relationship with respect to one another.

11. The cycle reflector as defined in claim 9, further comprising a third generally flat surface comprising two legs downwardly depending from said first flat surface and forming a generally inverted U-shaped configuration therewith, each of said legs being joined to said first surface at an angle appropriate to produce an alignment of said third surface substantially vertical and substantially normal to the direction of travel of the cycle in its conventional operating position, and said third flat surface having reflecting means thereon.

12. A cycle-caliper brake subassembly comprising a cycle fork member, a caliper braking mechanism, bolt means for fastening said caliper braking mechanism to said cycle fork member and, positioned between said caliper braking mechanism and said fork member, the cycle reflector defined by claim 1.

13. The cycle-caliper brake subassembly as defined by claim 12, wherein said fork member is a front fork member and said reflector is adapted for installation on the front fork assembly of a cycle as a combined reflector and brake protector, and comprises an inverted generally U-shaped configuration with the downwardly depending legs of said inverted U extending to a point at least about at the respective brake pads of said caliper braking assembly, wherein said first and second flat surfaces comprise respectively the back and front surfaces of said generally U-shaped configuration.

14. The cycle-caliper brake subassembly as defined by claim 12, wherein said fork member is a rear fork member and said reflector is adapted for installation on the rear fork assembly of a cycle and comprises a non-planar configuration wherein said first flat surface lies in a plane defined by said cycle fork assembly and said second flat surface is joined to said first surface at an angle appropriate to produce an alignment substantially vertical and substantially normal to the direction of travel of the cycle in its conventional operating position.

15. A cycle reflector, comprising a generally inverted U-shaped member, means to mount said U-shaped member to a fork assembly of a cycle, reflecting means disposed upon the U-shaped member, wherein at least a portion of the downwardly depending legs and at least a portion of the transverse base portion of the inverted U are oriented so that the major surfaces thereof are substantially vertical and substantially normal to the direction of travel of the cycle in its conventional operating position, and at least two lateral support members protruding from the surface of the U-shaped member on the side adjacent to the cycle frame, said lateral support members being adapted to lie adjacent the lateral edges of said cycle fork assembly.

* * * * *